Patented June 5, 1951

2,556,108

UNITED STATES PATENT OFFICE 2,556,108

MANUFACTURE OF CONDENSATION PRODUCTS

Paul M. Ruedrich, Berkeley, Calif., assignor to Griffin Chemical Company, a company of California No Drawing. Application May 31, 1949, Serial No. 96,399

8 Claims. (Cl. 260—400)

This invention relates to sulfonic acid derivatives and particularly to certain new derivatives having many new and useful properties.

It is known that certain carefully selected and prepared sulfonic acids and their metal salts are useful as lubricating oil additives, in rust-proofing compositions and for many other uses. In the field of lubricant compounding, their presence improves detergency, lowers corrosion, reduces sludge formation and increases the resistance to lacquer formation while in the rust-prevention field improved wetting, metal adhesion and displacement resistance follow their use. The utility of these acids and salts is not restricted to the fields mentioned, for they are useful in other compositions.

Even though such sulfonates are generally considered in the art as being the most suitable products for imparting these properties to lubricating oils and other petroleum fractions, their use in these and other fields would be considerably extended and present standards of performance exceeded under conditions wherein the sulfonic acid could be made more stable and the range of sulfonic acids presently considered suitable for these uses expanded. This invention relates to certain extensions of the desirable characteristics of the sulfonic acids which broadens the field of the sulfonic acids useful for these and for other purposes, at the same time that certain objections to their use are reduced or removed.

I have discovered that this can be obtained if a suitable sulfonic acid is condensed with an organic material of inherently high stability or which, when combined with the sulfonic acid results in a compound of greater stability than the acid per se. This compound is useful as such, or as a salt. The sulfonic acid-material reaction is apparently a condensation for it proceeds with only formation of the novel condensation product of this invention if the reaction is carried on as will be presently described. The following reaction can be written as typifying such a condensation and formation of the new compounds of this invention:

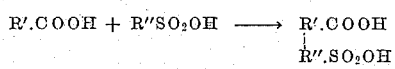

A dotted line is shown as joining R and R since R is an organic compound containing more than one carbon atom and the position of the bond may vary. If a mono-valent salt forming metal is thereafter reacted with this compound to form a salt, the compound will be of the formula:

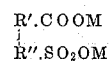

while if the salt forming metal is di-valent, the compound will be of the formula:

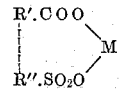

In each case, M is representative of a salt forming element, R'' is representative of the sulfonic acid derived from a hydrocarbon found as in petroleum and R' is a monocarboxylic acid of an aliphatic character having at least twelve carbon atoms. Such acids include abietic acid, naphthenic acid, ricinoleic acid, phenyl-stearic acid and chlor-stearic acid, oxidized paraffinic hydrocarbons of high molecular weight, oxidized naphthenic hydrocarbons of high molecular weight, and alkylated cyclic hydroxy compounds. The acids can be used as such or in their ester form or one can use them in the form in which they are frequently handled in commerce such as wool fat, certain grades of garbage grease, whale oil, shark, menhaden and other fish oils, spermaceti, tallow, coconut oil, China-wood oil, oiticia oil, soya bean oil, palm oil, montan wax, carnauba wax, Japan wax, Chinese wax, rosin, as well as the various individual acids thereof such as lauric, stearic, palmitic, oleic, myristic, naphthenic, or behenic acids, their halogenated derivatives or mixtures of any of these fats, oils, waxes, resins and acids.

The resulting product can thereafter be reacted with sufficient of an alkali metal, e. g. ammonia, lithium, sodium and potassium, an alkaline earth metal, e. g. calcium, strontium, barium, magnesium, a metal such as zinc, copper, silver, aluminum, tin, lead, antimony, bismuth, chromium, molybdenum, manganese, iron, cobalt and nickel, or an aliphatic or an aromatic amine to form a product and to which I apply the term salt, and which is generally soluble in all proportions in a petroleum oil and, when added to a suitable petroleum fraction, improves the quality thereof in the various respects indicated.

The petroleum sulfonic acids which are preferably employed to produce the sulfonates of this invention are those of the oil-soluble type which are obtained, for example, in the treatment of relatively heavy mineral oils, preferably so-called naphthenic oils such as California or Mid-Continent oils, with concentrated or preferably fuming sulfuric acid. In this kind of treatment two types of sulfonic acids are produced, namely, so-called green sulfonic acids which are substantially oil-insoluble and mahogany acids which are oil-soluble. The mahogany acids are preferred, although the green acids may also yield certain oil-soluble soaps which are applicable to the purposes of the invention. Other oil-soluble hydrocarbon sulfonic acids suitable for the invention may be produced by the sulfonation of various hydrocarbons and these are therefore equivalent to the oil-soluble sulfonic acids derived from petroleum.

The petroleum sulfonic acids also preferably have a molecular weight between 350 and 550; the products of those acids which have a weight lower than 350 are not useful as oil additives in contact with engine bearings for they are corrosive to these although they are useful for other of the purposes which I have listed.

To manufacture the material of the present invention, the sulfonic acid is first reacted with a monocarboxylic aliphatic acid having at least twelve carbon atoms at a temperature preferably of the order of 250°–300° F., and for a time sufficient to ensure that the reaction between the two is sufficiently complete. It is essential to practice of this invention and to the manufacture of the novel products which characterize it that the temperature not exceed 300° F. materially and in any case not exceed 320° F. It is also required that the reaction temperature be above about 250° F. The reaction is usually complete in several hours at 250° F. and the time required decreases as the temperature is increased.

It is in general the broad object of this invention to provide a new sulfonic acid derivative having certain desirable and beneficial properties as compared to presently known sulfonic acid salts.

Another object of this invention is to provide an improved lubricant, especially one which is non-corrosive to metal surfaces such as alloy bearings in an engine.

An additional object is to provide an improved rust-preventative composition.

The invention includes other objects and features of advantage some of which, together with the foregoing, will appear hereinafter wherein certain procedures are set forth as illustrative of preparation of the novel compounds of this invention, but without any intention to limit the invention to these:

*Example 1.*—To prepare a product of this invention, three mols of a mahogany sulfonic acid (based on the true sulfonic acid content) were heated under reflux with a mol of the triglyceride of ricinoleic acid (castor oil) for several hours at approximatey 300° F. At the end of this time the product was neutralized with an aqueous slurry of calcium hydroxide to form the calcium salt and was then dehydrated. The product was a dark brown material, solid at room temperature, and readily soluble in both mineral and vegetable oils. The sulfonate was an oil soluble sulfonate resulting from treatment of a white oil stock, after purification with isopropyl alcohol (the sulfonate containing 57% by weight sulfonic acids, hydrocarbon oil 37%, water 6%, mineral salt—a trace; its average molecular weight was 411).

*Example 2.*—To illustrate the wide variety of sulfonates which can be employed, like products were manufactured under the conditions of Example 1 from the sulfonic acids abtained in the manufacture of (1) a horticultural spray oil (molecular weight of sulfonic acids 394.0), (2) a transformer oil (molecular weight of sulfonic acids 386.0), and (3) a lubricating oil (molecular weight of sulfonic acids 442), the materials and procedure being otherwise identical with that given above under Example 1.

*Example 3.*—To illustrate that compounds other than castor oil can be employed, similar compositions were manufactured under the conditions of Example 1, but using abietic acid, naphthenic acid, an oxidized paraffinic hydrocarbon (ALOX) and diamylphenol, an alkylated aromatic hydroxy compound.

*Example 4.*—To illustrate utility of the material produced in Example 1 in reducing the corrosiveness of a petroleum oil, three separate volumes of the same 100 viscosity petroleum pale oil were prepared. To the first of these was added 3% of calcium sulfonate; to the second was added 3% of calcium sulfonate and 2.3% castor oil, the two being unreacted; to the third was added 5.3% of the product of the present invention which contained the equivalent of 3% of calcium sulfonate and 2.3% castor oil. Each of the three oils so prepared was then placed in a beaker and heated in the presence of a copper-lead bearing at 356° F. for 48 hours. Each bearing was removed at 8-hour intervals, washed with chloroform and weighed to determine the loss by corrosion. The results are listed in the following table; the loss in weight being given in milligrams:

| Composition of Blend | Bearing Loss, Mg. | | | | | |
|---|---|---|---|---|---|---|
| | 8 hrs. | 16 hrs. | 24 hrs. | 32 hrs. | 40 hrs. | 48 hrs. |
| 3.0% Ca-Sulfonate / 97.0% 100 Pale Oil | 15.2 | 33.1 | 60.5 | 124.0 | | |
| 3.0% Ca-Sulfonate / 2.3% Castor Oil / 94.7% 100 Pale Oil } Blend | 6.5 | 14.1 | 25.5 | 41.6 | 86.0 | |
| 3.0% Ca-Sulfonate / 2.3% Castor Oil / 94.7% 100 Pale Oil } Reacted Composition | 0.8 | 1.2 | 2.6 | 7.4 | 12.6 | 19.5 |

It will be observed that the composition of this invention reduced corrosion at the end of 32 hours to less than half that which occurred in 8 hours with the usual sulfonate.

*Example 5.*—The comparative corrosion reductive effect of the products of Example 2 upon a copper-lead bearing at 356° F. is shown in the following table:

| Composition of Blend | Bearing Loss, Mg. | | | | | |
|---|---|---|---|---|---|---|
| | 8 hrs. | 16 hrs. | 24 hrs. | 32 hrs. | 40 hrs. | 48 hrs. |
| 3.0% Ca-Sulfonate (Spray Oil) / 97.0% Pale Oil | 16.2 | 35.0 | 64.0 | | | |
| 3.0% Ca-Sulfonate (Spray Oil) / 2.4% Castor Oil / 94.6% 100 Pale Oil } Reacted | +0.2 | +0.5 | 0.5 | 2.1 | 3.8 | 7.9 |
| 3.0% Ca-Sulfonate (Trans. Oil) / 97.0% 100 Pale Oil | 14.0 | 37.3 | 70.1 | | | |
| 3.0% Ca-Sulfonate (Trans. Oil) / 2.4% Castor Oil / 94.6% 100 Pale Oil } Reacted | +0.1 | 0.8 | 1.8 | 3.3 | 5.4 | 11.2 |
| 3.0% Ca-Sulfonate (Lube Oil) / 97.0% 100 Pale Oil | 11.7 | 34.5 | 33.6 | 69.0 | | |
| 3.0% Ca-Sulfonate (Lube Oil) / 2.1% Castor Oil / 94.9% 100 Pale Oil } Reacted | +0.8 | +1.5 | +1.0 | 2.1 | 4.3 | 8.9 |

*Example 6.*—The reduction in corrosion of the products of Example 3 is shown in the following table:

| Composition of Blend | Bearing Loss, Mg. | | | | | |
|---|---|---|---|---|---|---|
| | 8 hrs. | 16 hrs. | 24 hrs. | 32 hrs. | 40 hrs. | 48 hrs. |
| 3.0% Ca-Sulfonate / 97.0% 100 Pale Oil | 15.2 | 33.1 | 60.5 | 124.0 | | |
| 3.0% Ca-Sulfonate-Abietic Acid Composition / 97.0% 100 Pale Oil | 0 | 0 | 1.0 | 1.7 | 2.5 | 3.5 |
| 3.0% Ca-Sulfonate-Naphthenic Acid Composition / 97.0% 100 Pale Oil | 0.2 | 0.5 | 0.9 | 1.4 | 2.2 | 3.5 |
| 5.0% Ca-Sulfonate-ALOX Composition / 95.0% 100 Pale Oil | 0.8 | 1.5 | 3.0 | 4.1 | 5.5 | 8.5 |
| 5.0% Ca-Sulfonate-Diamylphenol Composition / 95.0% 100 Pale Oil | 1.9 | 5.0 | 8.5 | 17.2 | 28.4 | 42.0 |

*Example 7.*—To illustrate the necessity for inclusion of the castor oil or an equivalent material, a sludge-free acid-treated oil containing 10% sulfonic acid was divided into two parts. One was directly neutralized with lime while the second was first reacted with castor oil and then treated with lime. The effect upon the corrosion reduction of the composition including castor oil is shown in the following table:

| Composition of Blend | Bearing Loss, Mg. | | | | | |
|---|---|---|---|---|---|---|
| | 8 hrs. | 16 hrs. | 24 hrs. | 32 hrs. | 40 hrs. | 48 hrs. |
| 3.0% Ca-Sulfonate / 97.0% 100 Pale Oil | 9.0 | 22.5 | 38.0 | 61.5 | 94.2 | |
| 5.2% Ca-Sulfonate-Castor Oil Composition (containing calcium and sulfonic acid equivalent to 3% of Ca-Sulfonate) / 94.8% 100 Pale Oil | 0.2 | 1.0 | 1.5 | 3.0 | 3.5 | 4.2 |

The results given above show clearly that the sulfonic acid need not be isolated from the oil and that it can be used as such and the novel, condensed sulfonate formed in situ providing that the solvent in which it is present is compatible with the use to which the composition is put.

While I have mentioned the utility of the new sulfonates as applied to lubricant compounding and in rust-proofing, utility of the derivatives is not limited to these, for the compounds are useful in many other ways such as wetting agents, detergents, emulsifiers, paint and varnish driers, plasticizer and for many other uses.

This is a continuation-in-part of my application Serial No. 616,972, filed September 17, 1945, now abandoned.

I claim:

1. The process comprising heating an oil soluble petroleum sulfonic acid and castor oil to a temperature of approximately 300° F. for several hours to effect a condensation of said acid produced by heating an oil soluble petroleum sulfonic acid and ricinoleic acid to a temperature of approximately 300° F. for several hours to effect a condensation of said acid and said castor oil and said castor oil through junction of the two in their non-acid portions.

2. As a new composition of matter, the condensation product of an oil soluble petroleum sulfonic acid and castor oil, said product being through junction of the two in their non-acid portions.

3. The process comprising heating an oil soluble petroleum sulfonic acid and a substance selected from the group consisting of a monocarboxylic aliphatic acid having at least twelve carbon atoms and esters thereof to a temperature between 250° and 320° F. for several hours to effect a condensation of said acid and said substance through junction of the two in their non-acid portions.

4. As a new composition of matter, the condensation product of an oil soluble petroleum sulfonic acid and a substance selected from the group consisting of a monocarboxylic aliphatic acid having at least twelve carbon atoms and esters thereof, said product being produced by heating said sulfonic acid and said aliphatic acid to a temperature between 250° and 320° F. for several hours to effect a condensation of said acids and said substance through junction of the two in their non-acid portions.

5. The process comprising heating petroleum sulfonic acid and a substance selected from the group consisting of a monocarboxylic aliphatic acid having at least twelve carbon atoms and esters thereof to a temperature between 250° and 320° F. for several hours to effect a condensation of said acid and said substance through junction of the two in their non-acid portions.

6. As a new composition of matter, the condensation product of petroleum sulfonic acid and a substance selected from the group consisting of a monocarboxylic aliphatic acid having at least twelve carbon atoms and esters thereof, said product being produced by heating said sulfonic acid and said aliphatic acid to a temperature between 250° and 320° F. for several hours to effect a condensation of said acid and said substance through junction of the two in their non-acid portions.

7. The process comprising heating an oil soluble petroleum sulfonic acid having a molecular weight between 350 and 550 and a substance selected from the group consisting of a monocarboxylic aliphatic acid having at least twelve carbon atoms and esters thereof to a temperature of between 250° and 300° F. for several hours to effect a condensation of said acid and said substance through junction of the two in their non-acid portions.

8. As a new composition of matter, the condensation product of an oil soluble petroleum sulfonic acid having a molecular weight between 350 and 550 and a substance selected from the group consisting of a monocarboxylic aliphatic acid having at least twelve carbon atoms and esters thereof, said product being produced by heating an oil soluble petroleum sulfonic acid and said aliphatic acid to a temperature of between 250° and 300° F. for several hours to effect a condensation of said acid and said substance through junction of the two in their non-acid portions.

PAUL M. RUEDRICH.

REFERENCES CITED

The following references are of record in the file of this patent:

UNITED STATES PATENTS

| Number | Name | Date |
|---|---|---|
| 1,980,342 | Kern | Nov. 13, 1934 |
| 2,032,314 | Bertsch | Feb. 25, 1936 |
| 2,052,570 | Kaplan | Sept. 1, 1936 |